(12) United States Patent
Gustafson

(10) Patent No.: US 8,375,904 B2
(45) Date of Patent: Feb. 19, 2013

(54) EARLY INTAKE VALVE CLOSING AND VARIABLE VALVE TIMING ASSEMBLY AND METHOD

(75) Inventor: Richard J. Gustafson, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 343 days.

(21) Appl. No.: 12/708,276

(22) Filed: Feb. 18, 2010

(65) Prior Publication Data
US 2011/0197834 A1    Aug. 18, 2011

(51) Int. Cl.
*F01L 1/34* (2006.01)
(52) U.S. Cl. ............... 123/90.15; 123/90.16; 123/90.17; 123/348
(58) Field of Classification Search ............... 123/90.16, 123/90.15, 90.17, 347, 348
See application file for complete search history.

(56) References Cited

U.S. PATENT DOCUMENTS

| | | | |
|---|---|---|---|
| 4,716,863 A | 1/1988 | Pruzan | |
| 6,883,492 B2 | 4/2005 | Vanderpoel et al. | |
| 7,059,282 B2 | 6/2006 | Vorih et al. | |
| 7,178,492 B2 | 2/2007 | Coleman et al. | |
| 7,201,121 B2 | 4/2007 | Weber et al. | |
| 7,222,614 B2 | 5/2007 | Bryant | |
| 7,252,054 B2 * | 8/2007 | Weber et al. ............... | 123/90.15 |
| 2006/0201152 A1 | 9/2006 | Irisawa | |

* cited by examiner

Primary Examiner — Ching Chang
(74) Attorney, Agent, or Firm — Studebaker & Brackett PC; Tim L. Brackett, Jr.

(57) ABSTRACT

An early intake valve closing (EIVC) and variable valve timing (VVT) assembly and method are provided for an internal combustion engine. The method includes operating an intake valve to open and close an intake port and allow intake gas to enter a cylinder of the internal combustion engine containing a piston, where the timing of the closing of the intake valve occurs at or before bottom dead center (BDC) of the compression stroke of the piston. The method further includes selectively extending duration of the opening of the intake port by an amount that delays closing timing of the intake valve until after BDC of the piston compression stroke. An assembly for EIVC and VVT includes a cylinder head including an intake valve and intake port and a rotatably mounted camshaft including an intake lobe operatively connected to the intake valve to periodically move the valve into the first and second positions. The intake lobe is shaped such that the timing of the closing position occurs at or before BDC of a compression stroke of the piston. The assembly further includes a selectively activatable VVT assembly having an actuator that operatively engages the intake valve before the intake valve reaches the closed position to extend duration of the intake valve opening until after BDC of the piston compression stroke.

13 Claims, 2 Drawing Sheets

<u>Prior Art</u>

EARLY INTAKE VALVE CLOSING AND VARIABLE VALVE TIMING ASSEMBLY AND METHOD

FIELD OF THE INVENTION

An assembly and method for early intake valve closing and variable valve timing are disclosed.

BACKGROUND

Internal combustion engines can utilize a Miller cycle to reduce parasitic pumping losses and fuel consumption rate. The Miller cycle has a greater expansion rate than compression rate because the mass of intake gas trapped in a cylinder of the engine during a compression stroke is reduced relative to an amount trapped during a standard intake closing event for a four stroke (e.g., Otto cycle) engine. A Miller cycle can be performed by controlling the intake valve closing using an early intake valve closing (EIVC) or late intake valve closing (LIVC) strategy.

SUMMARY

An assembly and method to selectively achieve early intake valve closing (EIVC) in an internal combustion engine is provided by the invention.

More particularly, embodiments consistent with the invention relate to a method of operating an early intake valve closing (EIVC) internal combustion engine, including processes of periodically operating an intake valve to open and close an intake port and allow intake gas to enter a cylinder of the internal combustion engine containing a piston, where the timing of the closing of the intake valve occurs at or before bottom dead center (BDC) of the compression stroke of the piston. The method further includes selectively extending duration of the opening of the intake port by an amount that delays a timing of the closing of the intake valve until after BDC of the piston compression stroke.

In accordance with other embodiments consistent with the invention, an early intake valve closing (EIVC) and variable valve timing (VVT) assembly for an internal combustion engine is provided, and includes a cylinder head for covering a cylinder containing a piston movable in a reciprocating manner in the cylinder. The cylinder head includes an intake valve and intake port, and the intake valve is moveable between an open position allowing intake gas to enter the cylinder through the intake port and a closed position that prevents intake gas from entering the cylinder through the intake port. The assembly includes a rotatably mounted camshaft including an intake lobe operatively connected to the intake valve to periodically move the intake valve into the open and closed positions. The intake lobe is shaped such that a timing of the closing position occurs at or before bottom dead center (BDC) of a compression stroke of the piston. The assembly further includes a selectively activatable VVT assembly adapted to operatively engage the intake valve before the intake valve reaches the closed position to extend a duration of the intake valve in the open position until after BDC of the piston compression stroke.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art. Descriptions of well-known functions and constructions are omitted for clarity and conciseness. To aid in clarity of description, direction terms such as "ascending," "clockwise," "downward," and "upward," as used herein, provide reference with respect to orientation of the accompanying drawings and are not meant to be limiting.

Figure 1:
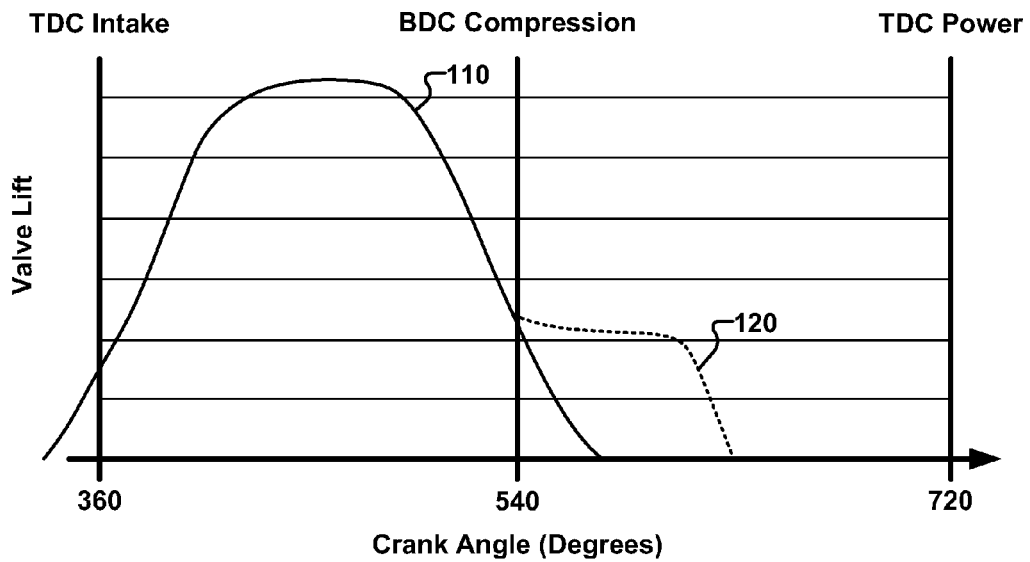
FIG. 1 is a graph depicting valve lift versus engine crank angle with and without late intake valve closing (LIVC) Miller cycle operation.

FIG. 1 is a graph showing an internal combustion engine intake valve lift profile over a typical duration of engine crank angle when performing a standard LIVC Miller cycle. The solid line 110 illustrates a cam profile of the internal combustion engine without the Miller cycle, and the dotted line 120 illustrates an extended duration of lift with a closing timing much after bottom dead center (ABDC) of the compression stroke. This closing timing can range from about 50° to 60° ABDC to an angle corresponding to more than one half of the compression stroke. During this extended intake valve opening duration, intake gas in the cylinder, which can include any one, or combinations of air, an air and fuel (e.g., diesel, gasoline or natural gas) mixture, and recycled exhaust gas (EGR), is forced to flow back into the intake manifold because the piston in the cylinder is ascending during the compression stroke, resulting in an intake gas mass being compressed by the compression stroke of the piston being reduced relative to an intake valve closing occurring closer to BDC of the compression stroke (i.e., BDC compression).

However, the LIVC Miller cycle has been found to have the disadvantage of increased flow losses by intake gas flowing into and back out of the cylinder through the intake valve port while the valve is open during the compression stroke. Additionally, the gas flowing out of the cylinder during the compression stroke of the piston is reheated as it passes hot cylinder components, and this reheated gas flows back into the intake manifold. This reheated gas can undesirably and significantly increase the temperature of the intake manifold, for example, by an amount of about 15° F. or more.

Figure 2A:
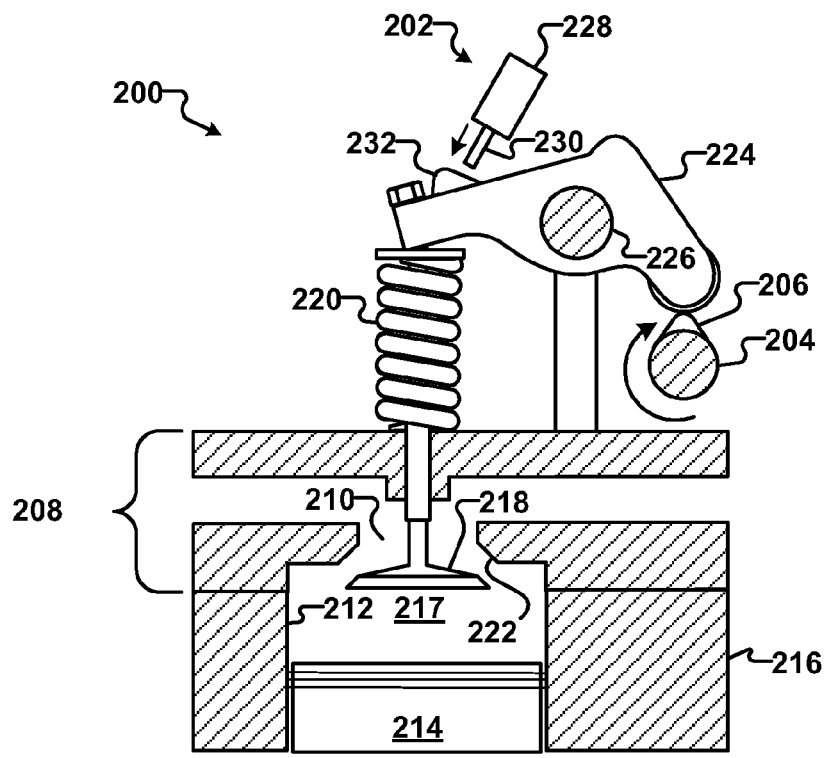
FIG. 2A is a diagram of an internal combustion engine cylinder head and valve assembly when the camshaft is at a position of maximum lift according to an exemplary embodiment.
Figure 2B:
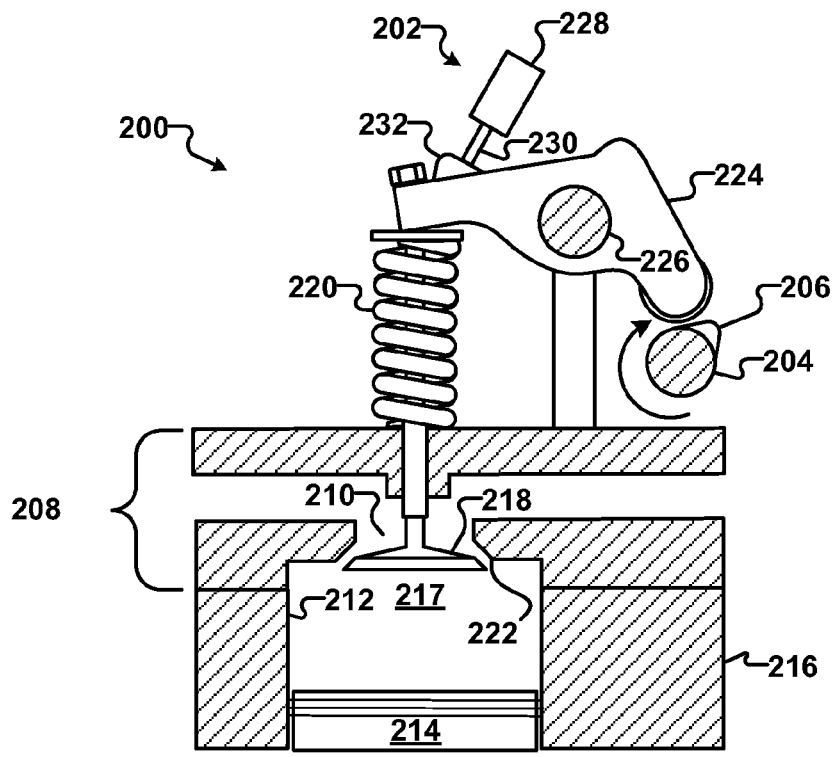
FIG. 2B is a diagram of the exemplary cylinder head and valve assembly of FIG. 2A after the camshaft has rotated past the position of maximum lift.

FIGS. 2A and 2B show a portion of an internal combustion engine including an early intake valve closing (EIVC) and variable valve timing (VVT) assembly 200 according to an exemplary embodiment. The EIVC and VVT assembly 200 includes a selectively applied latching type VVT mechanism 202 in combination with camshaft 204 having an intake camshaft lobe 206 with a short lift duration profile. The EIVC and VVT assembly 200 avoids the significant flow losses and/or increases in intake manifold temperature present in LIVC Miller cycle internal combustion engines.

With reference to FIG. 2A, the EIVC and VVT assembly 200 includes a cylinder head 208 having at least one intake port 210 through which intake gas is provided to a cylinder 212 containing a piston 204 slidably movable within the cylinder 212. The cylinder head 208 covers and seals a portion of an engine block 216 containing elements such as the cylinder 212, the piston 214, a piston connecting rod (not shown), and a rotating crankshaft (not shown). It is to be understood that FIGS. 2A and 2B only depict the portions of the cylinder head and engine block necessary for understanding the invention. The piston 214 is driven in a reciprocal motion in the cylinder 212 between top dead center (TDC) and BDC relative to the crankshaft position by the piston connecting rod connected at one end portion thereof to the piston 214 and at an opposite end portion thereof to the rotating crankshaft via lubricated bearings.

The cylinder head 208, cylinder 212, and the piston 214 define a combustion chamber 217 into which intake gas is introduced for combustion. Intake gas is introduced into the combustion chamber by opening an intake valve 218 such that a facing of the valve 218 disengages a seating engagement with a valve seat 222. Each cylinder in the cylinder head 208 also includes at least one exhaust port and respective exhaust valve (not shown) for allowing combusted gases to be removed from the cylinder after combustion in an exhaust stroke of the piston 214 just prior to an intake stroke when intake valve 218 opens to allow intake gas to enter the cylinder 212 through the intake port 210. The number of cylinders and valves per cylinder associated with the cylinder head 208 depends on the kind of engine application. For example, an engine can include a total of four, six, eight or more cylinders, and can be arranged in an inline, V, radial or opposed configuration. Also, the supplied intake gas can be pressurized using a turbocharger (not shown) in fluid connection with the combustion chamber 217.

The opening and closing of the intake port 210 is controlled by a valve assembly that includes an intake valve 218, a valve spring 220, and a rocker arm 224 that moves in a reciprocal manner about a pivot 226 as a camshaft 204 rotates at half the rate of the crankshaft (not shown). The valve spring 220 biases the outer end of the stem of valve 218 away from the cylinder head 208, thereby biasing a facing of the valve 218 toward seating engagement with the valve seat 222. As long as the intake valve 218 is in an open position, i.e. any position that intake valve 218 takes when it is not engaged with the valve seat 222, intake gas can pass through the intake port.

Figure 3:
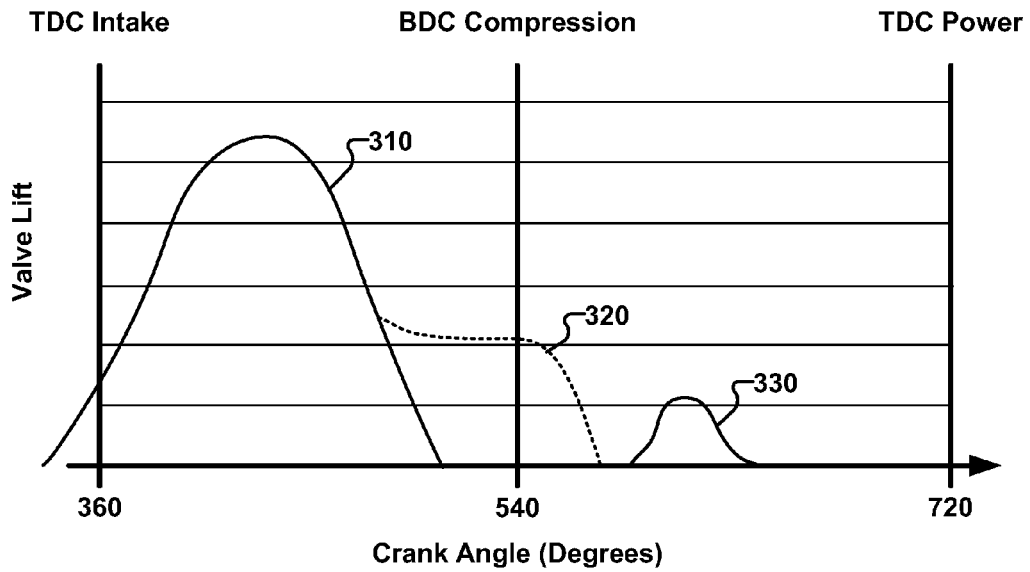
FIG. 3 is a graph depicting valve lift versus engine crank angle with and without early intake valve closing (EIVC) Miller cycle operation in accordance with an exemplary embodiment.

The profile of the intake camshaft lobe 206 is depicted in an exaggerated manner in FIG. 2A for purpose of explanation, and the lift of the intake profile as it relates to crankshaft angle is represented by the solid line plot 310 of FIG. 3. It will be appreciated that the actual profile of the lift of intake valve 218 can take one of numerous shapes, but that the duration of each would be relatively short to provide Miller effects when desired. As the camshaft 204 turns, the intake camshaft lobe 206 periodically engages the rocker arm 224 to cause the rocker arm 224 to pivot about pivot 226, which in turn forces the intake valve 218 in a downward direction such that the intake valve 218 disengages the seat 222 and allows intake gas to pass through the intake port 210. FIG. 2A shows the camshaft lobe 206 in a position providing maximum lift to the intake valve 218. As camshaft rotates from the position depicted in FIG. 2A, the rocker arm 224 pivots in a clockwise direction about pivot 226 because the spring 220 forces the stem of the intake valve 218, and thus an end portion of the rocker arm engaging the stem, in an upward direction, as depicted in FIG. 2A, until the intake valve 218 closes in a seating engagement with the valve seat 222.

As shown in FIG. 3, an exemplary profile of the intake camshaft lobe 206 permits the engine to be operated according to a Miller cycle because the intake valve 218 closes "early" (i.e., EIVC) due to the shape of the camshaft lobe 206. For example, an early closing can be provided when the intake valve is at 1 mm lift in the range of −275° to about −180° before top dead center (BTDC) of the crankshaft at the power stroke. In an exemplary embodiment, the shape of the intake camshaft lobe 206 can cause the intake valve 218 to close at about 235° BTDC of the power stroke in a Miller cycle operation mode.

With reference to FIG. 2A, the EIVC and VVT assembly 200 includes a VVT apparatus 202 to permit an internal combustion engine mode of operation without a Miller cycle. The VVT apparatus 202 includes a rod 230 that extends in the direction of the rocker arm to prevent the intake valve 218 from closing for a predetermined duration of crank rotation angle later than the closing defined by the profile of the intake camshaft lobe 206. This extended duration is shown by dashed plot 320 in FIG. 3. As can be seen in FIG. 2B, when the VVT apparatus 202 is activated and engages the rocker arm, the valve 218 is held open until it closes ABDC, as indicated where graph 320 of FIG. 3 crosses the abscissa.

Referring again to FIGS. 2A and 2B, the VVT apparatus 202 includes an actuator 228, for example, a hydraulically or electromagnetically based actuator such as those described in U.S. Pat. Nos. 5,775,203 and 5,983,863, each of which is hereby incorporated by reference in its entirety. The VVT apparatus 202 is activated when no Miller cycle is desired by activating actuator 228 to extend the rod 230 while the lift of the valve 218 is greater than the prescribed lift at which the valve 218 is to be held in the open state. As shown in FIG. 2A, the rod 230 extends while the valve is open, but the rod 230 does not yet contact the land 232 on the rocker arm 224. In this way, the VVT apparatus 202 essentially acts in parallel to the actuation flow path. That is, the camshaft lobe 206, rocker arm 224 and valve 218 operate in parallel, or simultaneously with the VVT apparatus 202 so that the rod 230 of the VVT apparatus 202 contacts the rocker arm 224 to catch the rocker arm, and thus the valve 218, and prevent the valve from closing, i.e., "latches" the valve 218 during the retraction portion of the intake camshaft lobe 206, i.e., along a valve retraction portion of the camshaft lobe profile. At a prescribed later time, the actuator 228 is deactivated and rocker arm 224 retracted to allow the valve 218 to seat with the valve seat 222 under the force of the spring 220. In an embodiment, the valve 218 is caught on a land 232 of the rocker arm 224 to halt movement of the rocker arm 224 as it rotates to close the valve 218, thus locking the valve 218 into an open state until the crankshaft rotates through the predetermined duration of crank angle. FIG. 2B shows the rod 230 extended and having engaged the land 232 at a point along the valve retraction portion of the camshaft lobe 206 after the camshaft 204 has rotated about 45° past the position where it would provide maximum lift, although different applications can include different intake cam profiles and valve train configurations.

When Miller cycle effect is not desired, for example, during engine startup or when the engine is idling, the VVT latching mechanism can be engaged to hold the intake valve open, for example, until nearly full volumetric efficiency is achieved. Some embodiments can include a single non-Miller cycle intake valve closing timing that occurs after a prescribed timing duration (i.e., VVT duration value). In other embodiments, the intake valve closing timing can be selected from plural possible predetermined VVT duration values. For example, an embodiment can include an engine controller or processor (not shown), such as an engine control unit (ECU, not shown), that can select a valve closing timing from one or more possible crank duration values. Such an embodiment can include plural stored VVT duration values linked to specific operating characteristics, such as a look up table storing plural crank duration values for the VVT latching mechanism to allow selection of a particular stored value based on the current engine operation and/or other environmental parameters, power demands. Alternatively, a VVT duration value can be determined by way of the engine controller or some other processor performing a calculation based on operating parameters such as load, speed, power demand, temperature etc.

Greater levels of internal exhaust gas recirculation (EGR) can be attained by optionally providing a slight opening of an exhaust valve just after BDC compression of the cylinder 212. This can be carried out because the exhaust manifold pressure is usually pulsing high just after BDC compression and with EVIC, and the cylinder pressure is depressed at this time (i.e., just after BDC compression). FIG. 3 shows a plot 330 representing lift after BDC compression of at least one exhaust valve (not shown) provided for each cylinder in the cylinder head 208. Opening the exhaust valve can be achieved by providing a bump on the exhaust camshaft lobe, although other known valve actuation mechanisms such as electromagnetic or hydraulic actuators can be used to open the exhaust valve during the compression stroke.

It will be appreciated that the embodiments described and shown herein may be modified in a number of ways. For instance, while the exemplary embodiments described above include an overhead camshaft, other embodiments may have a camshaft positioned in the engine block and include intermediate rocker arm driving mechanisms, such as pushrods, tappets etc. Furthermore, each cylinder of an internal combustion engine more than one intake valve driven separately or in a unified way with one another. Also, instead of a camshaft and rocker arm assembly driving each valve, embodiments can have each intake valve driven by electromagnetic actuation, or VVT latching provided by dedicated valves in addition to intake valves driven by a camshaft providing EIVC.

The EIVC and VVT assembly and method described herein can be used in any of a variety of applications requiring an internal combustion engine, such as mobile and stationary heavy duty machines, vehicles including heavy and light duty trucks and automobiles, construction equipment and the like.

Although a limited number of embodiments is described herein, one of ordinary skill in the art will readily recognize that there could be variations to any of these embodiments and those variations would be within the scope of the appended claims. Thus, it will be apparent to those skilled in the art that various changes and modifications can be made to the EIVC and VVT assembly and method described herein without departing from the scope of the appended claims and their equivalents.

What is claimed is:

1. A method of operating an early intake valve closing (EIVC) internal combustion engine, comprising:
   periodically operating an intake valve to open and close an intake port and allow intake gas to enter a cylinder of the internal combustion engine containing a piston, wherein timing of the closing of the intake valve occurs at or before bottom dead center (BDC) of the compression stroke of the piston; and
   selectively extending duration of the opening of the intake port by an amount that delays a timing of the closing of the intake valve until after BDC of the piston compression stroke;
   wherein the timing of the closing occurring at or before BDC of the compression stroke occurs between about −275° to about −180° before top dead center (TDC) of the power stroke of the piston at 1 mm lift of the intake valve.

2. The method of claim 1, wherein the intake valve closing timing occurring before BDC of the compression stroke is defined by a camshaft of the internal combustion engine.

3. The method of claim 2, wherein selectively extending the duration of the opening of the intake port comprises latching the valve on a valve retraction portion of a camshaft lobe profile of the camshaft to maintain the valve in an open state.

4. The method of claim 1, wherein the selective extension of the intake valve closing causes the intake valve to close between about −140° to about −190° before top dead center of the power stroke of the piston.

5. The method of claim 1, further comprising opening the exhaust valve after BDC of the compression stroke.

6. The method of claim 1, wherein the duration amount is determined from plural values based on at least one operating condition of the internal combustion engine.

7. The method of claim 1, wherein the duration is provided by activating a latching mechanism to maintain the intake valve in an open state while the intake valve is retracting to seal the intake port.

8. An early intake valve closing (EIVC) and variable valve timing (VVT) assembly for an internal combustion engine, comprising:
   a cylinder head for covering a cylinder containing a piston movable in a reciprocating manner in the cylinder, said cylinder head including an intake valve and intake port, wherein the intake valve is moveable between an open position allowing intake gas to enter the cylinder through the intake port and a closed position that prevents intake gas from entering the cylinder through the intake port;
   a rotatably mounted camshaft including an intake lobe operatively connected to the intake valve to periodically move the intake valve into the open and closed positions and shaped such that a timing of the closing position occurs at or before bottom dead center (BDC) of a compression stroke of the piston; and
   a selectively activatable VVT assembly adapted to operatively engage the intake valve before the intake valve reaches the closed position to extend a duration of the intake valve in the open position until after BDC of the piston compression stroke;
   wherein the timing of the closing occurring at or before BDC of the compression stroke occurs between about −275° to about −180° before top dead center (TDC) of the power stroke of the piston at 1 mm lift of the intake valve.

9. The assembly of claim 8, wherein the internal combustion engine operates using a Miller cycle when the VVT assembly is not selected for activation.

10. The assembly of claim 8, wherein selectively activating the VVT assembly extends an opening of the intake port to between about −140° to about −190° before top dead center of the power stroke of the piston.

11. The assembly of claim 8, wherein the cylinder head includes an exhaust valve for opening and closing an exhaust port of the cylinder, and the rotatably mounted camshaft further includes an exhaust lobe shaped to open the exhaust valve after BDC of the compression stroke.

12. The assembly of claim 8, wherein an amount of the duration of the opening is determined from plural values based on at least one operating condition of the internal combustion engine.

13. The assembly of claim 8, wherein the selectively activatable VVT assembly includes a latching mechanism that latches the intake valve in an open state while the intake valve is retracting towards the closed position and maintains the intake valve in the latched open state until after BDC of the piston compression stroke.

\* \* \* \* \*